United States Patent [19]
Ikeda et al.

[11] Patent Number: 5,106,148
[45] Date of Patent: Apr. 21, 1992

[54] FRONT BODY STRUCTURE OF AUTOMOTIVE VEHICLE

[75] Inventors: Yoshinori Ikeda, Hiroshima; Shirou Nakatani, Higashihiroshima, both of Japan

[73] Assignee: Mazda Motor Corporation, Hiroshima, Japan

[21] Appl. No.: 675,626

[22] Filed: Mar. 27, 1991

[30] Foreign Application Priority Data

Mar. 30, 1990 [JP] Japan ................................ 2-86825
Mar. 31, 1990 [JP] Japan ................................ 2-34562

[51] Int. Cl.⁵ ............................................ B60R 27/00
[52] U.S. Cl. .................................... 296/194; 296/203
[58] Field of Search ................ 296/193, 194, 203, 204

[56] References Cited

U.S. PATENT DOCUMENTS

| | | | |
|---|---|---|---|
| 4,822,096 | 4/1989 | Fujii | 296/194 |
| 4,829,409 | 5/1989 | Funkey | 296/194 X |
| 4,940,281 | 7/1990 | Komatsu | 296/194 |
| 4,964,672 | 10/1990 | Fujii | 296/194 X |

Primary Examiner—Margaret A. Focarino
Assistant Examiner—Gary C. Hoge
Attorney, Agent, or Firm—Fleit, Jacobson, Cohn, Price, Holman & Stern

[57] ABSTRACT

A front body of a vehicle has a pair of front side frames, which are separately located in a transverse direction of the vehicle and extend in a lengthwise direction, from front to back, of the vehicle. Each front side frame is rigidly attached, at one side, with a front wheel apron, and at another side with an upper shroud beam which extends in the transverse direction so as to form a radiator grill receiving opening. A space for receiving a head lamp is formed between the front wheel apron and the upper shroud beam on the front side frame.

3 Claims, 7 Drawing Sheets

FRONT BODY STRUCTURE OF AUTOMOTIVE VEHICLE

The present invention relates to part of the body structure of a vehicle, and, more particularly, to that portion of the front body structure of a car body in which head lamps are installed.

BACKGROUND OF THE INVENTION

1. Field of the Invention

Recently, conflicting demands have arisen in certain areas of car design. More particularly, an automotive vehicle is now required to have a car body with an engine room which is comparatively short in length and low in height, i.e., a short nose, low bonnet type car body. However, the car body must also have a high structural rigidity. In order to satisfy these design demands, the front body structure of a car body, in the location in which head lamps are installed, must be carefully designed.

2. Description of Related Art

Conventionally, the front body structure of a car body, in the location in which a head lamp is installed, includes a wheel apron, disposed on each side of the car body. The wheel apron is typically welded, or otherwise secured, to the back of a panel disposed on a front side of the car body. A front frame, extending in a lengthwise direction of the car body, may be secured, at its front end portion, to the panel, and an upper shroud member may be welded, or otherwise secured, to the wheel aprons at a front end of the car body. The upper shroud member is formed with a hole, or opening, to receive and hold a head lamp near a lower portion thereof. This front body structure is desirable in order to provide the necessary space for the head lamp and the necessary rigidity to the car body. Such a car body front body structure is known from, for instance, Japanese utility model application No. 62-60878, entitled "Dash Panel Structure for Automotive Vehicle," filed on April 22, 1987, and published as Japanese Unexamined Utility Model Publication No. 63-168167 on Nov. 1, 1988.

SUMMARY OF THE INVENTION

A primary object of the present invention is to provide a car body of the type which has a short nose, low bonnet front body structure having an improved structural rigidity.

According to the present invention, the front body structure of a vehicle includes a pair of front frames extending in a lengthwise direction the car body, an upper shroud member disposed at a front end portion of the car body, and a pair of wheel aprons disposed at opposite sides of the car body. The upper shroud member and the wheel apron are separately disposed, and the upper shroud member is connected at its one end to one side surface of the front frame. The wheel apron is connected to another side of the front frame, opposite to the one side, by a connecting member.

The front body structure, thus constructed, does not require arranging any structural member above a head lamp installed therein. This permits realization of a short nose, low bonnet type car body with the necessary structural rigidity. In addition, the front frame, because it is supported by both the upper shroud member and the wheel apron, is subjected to less vibration.

BRIEF DESCRIPTION OF THE DRAWINGS

The above and other objects and features of the present invention will be apparent to those skilled in the art from the following description of preferred embodiments thereof when considered in conjunction with the accompanying drawings, wherein similar reference numerals have been used to designate the same or similar elements throughout the drawings.

DETAILED DESCRIPTION OF THE PREFERRED EMBODIMENTS

Figure 1:
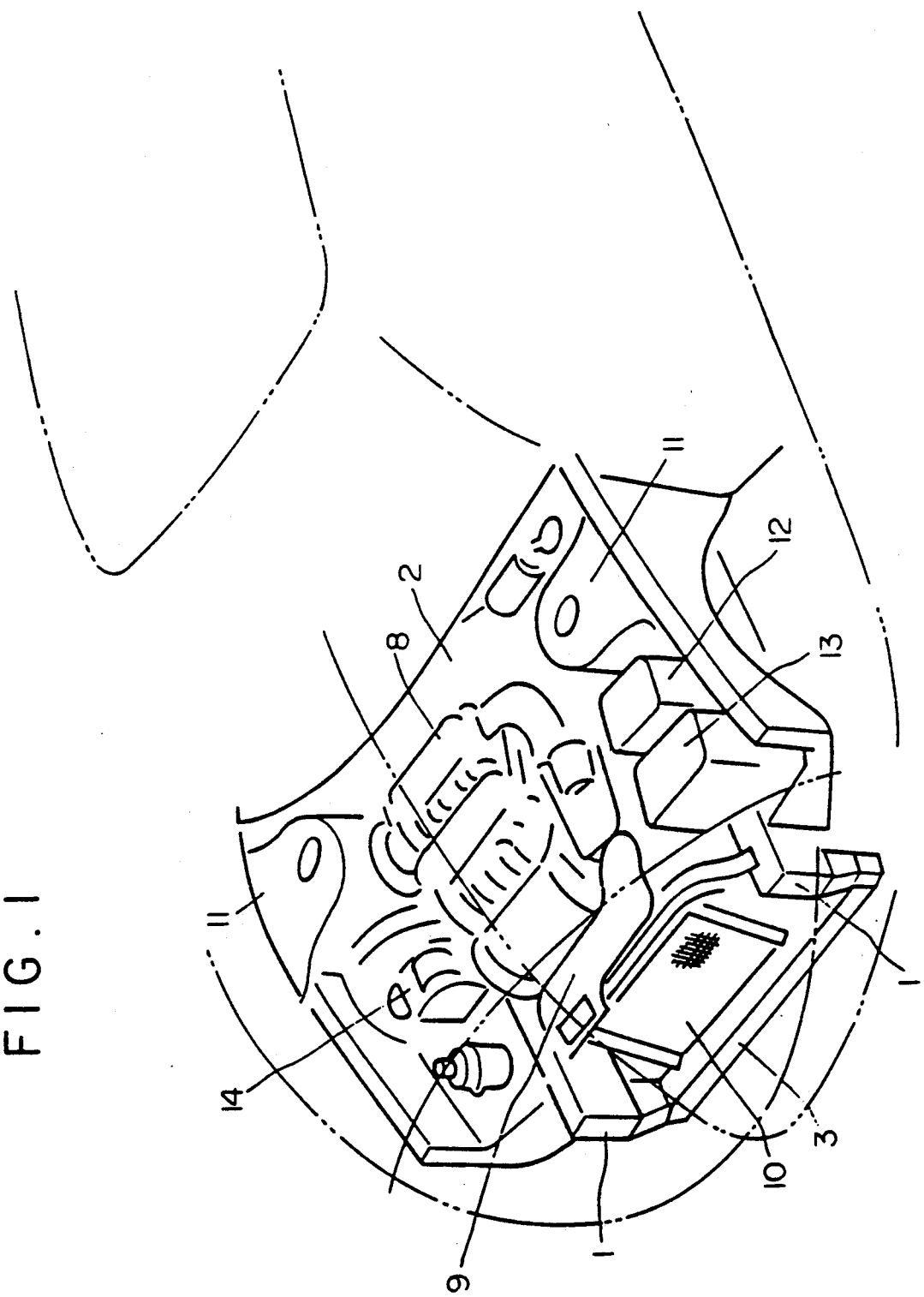
FIG. 1 is a schematic perspective view of an engine room of a car body in accordance with a preferred embodiment of the present invention.
Figure 2:
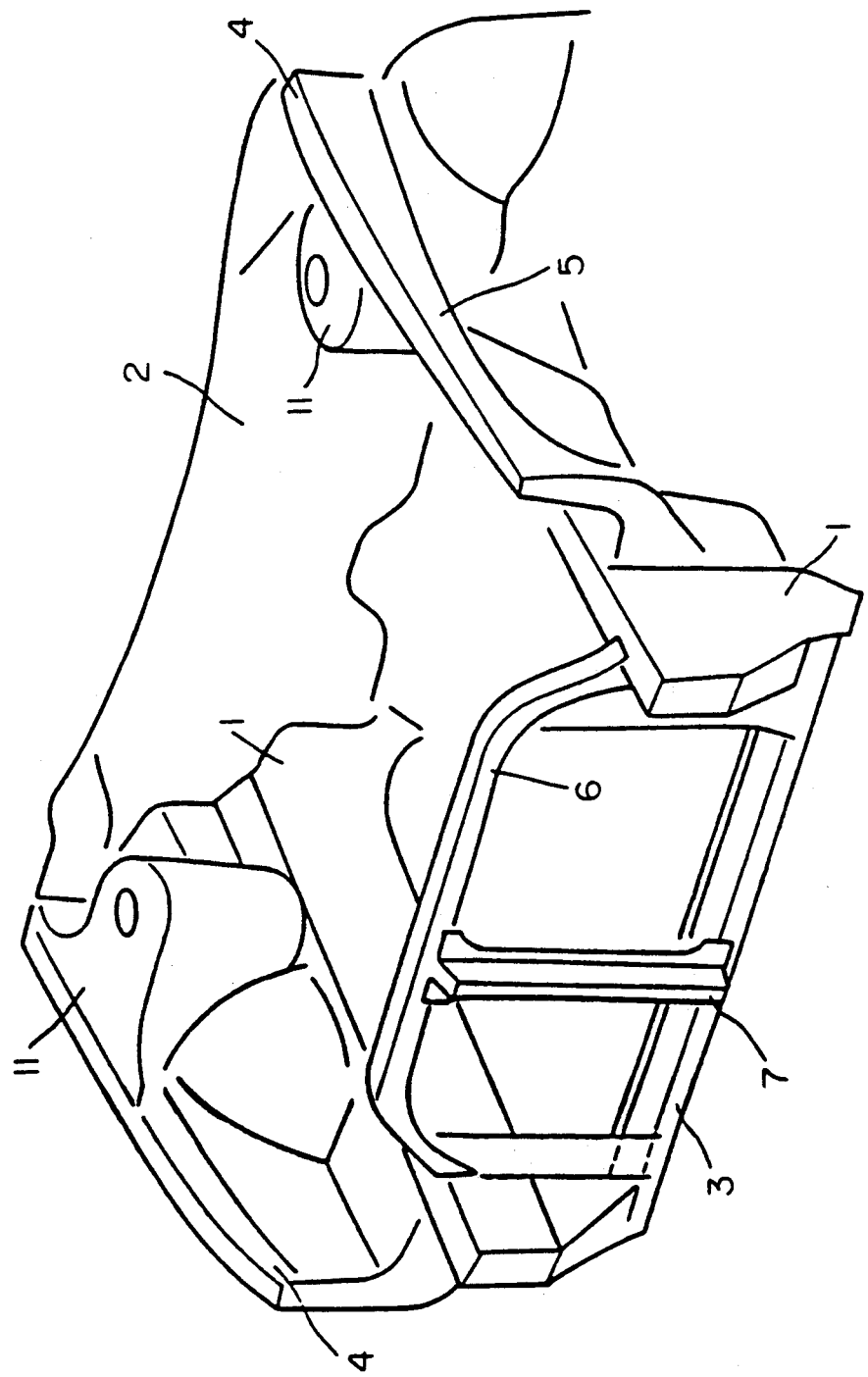
FIG. 2 is a schematic perspective view, showing a front body structure of the car body of FIG. 1.

Referring to the drawings in detail, a car body having a front body structure in accordance with a preferred embodiment of the present invention is partially shown. The front body structure includes a pair of left and right front side frames 1, each of which is made of a generally U-shaped channel member opening outward. Each side frame 1 extends in a lengthwise direction of the car body and is positioned at one of the right and left sides of the car body. Each front side frame 1 is welded, or otherwise secured, at its rear end to a dash panel 2 and at an under surface of its front end to a cross beam 3, extending in a transverse direction of the car body. On the outside of each front frame 1, there is provided a wheel apron 4, which extends in the lengthwise direction so a to partially cover a front wheel 16. The wheel apron is reinforced by a reinforcement 5. The reinforcement 5 is welded, or otherwise secured, to an outer surface of the wheel apron 4 so as to form a closed cross-section. The dash panel 2 and right and left front wheel aprons 4 define therebetween an open space serving as an engine room.

An upper shroud member 6, in the form of a transversely extending beam, is disposed in a space defined between the front side frames 1. A shroud stay 7 is welded, or otherwise secured, to mid portions of the cross beam 3 and the upper shroud beam 6 so as to interconnect the beams. These beams 3 and 6 form therebetween a space for receiving therein a radiator grill of a radiator 10 positioned in the engine room at a center part of the front end portion thereof.

Figure 3:
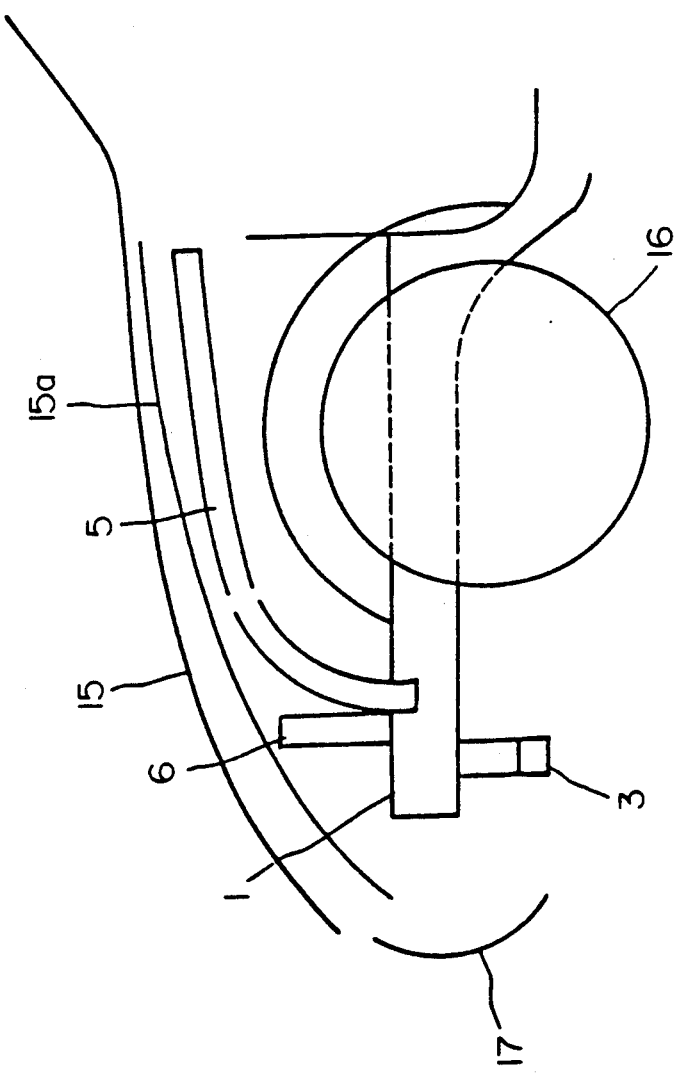
FIG. 3 is a side view of FIG. 2.

In the engine room, there is arranged an engine body 8 on one side, for instance, the left side in this embodiment, of a center line of the car body. The engine body 8 is mounted on an engine mount 14, and has an air intake duct or pipe 9 extending from the engine body 8 toward the front end of the vehicle. In the engine room are also provided suspension towers 11 at opposite sides thereof, a fuse-relay box 12, and a battery 13. The fuse-relay box 12 and the battery 13 are adjacent to each other and are both disposed in front of the left side suspension tower 11 as viewed in the lengthwise direction of the vehicle. The engine room is closed by a bonnet 15 (see FIG. 3) having side marginal edges 15a. The car body is further provided with a front bumper 17 in front of the radiator 10.

Figure 4:
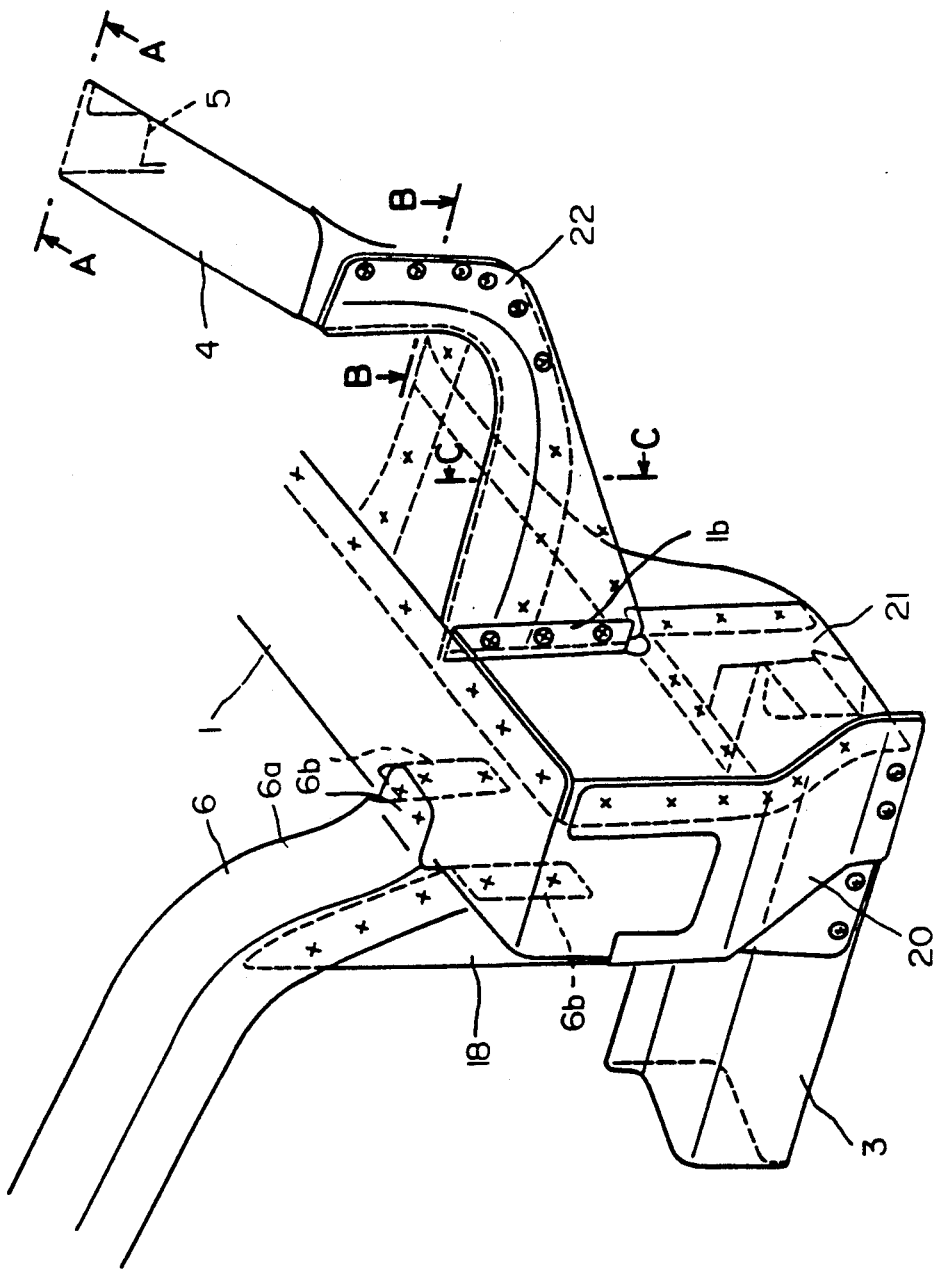
FIGS. 4 and 5 are perspective illustrations showing essential parts of the front body structure of FIG. 2 as seen from different positions.
Figure 5:
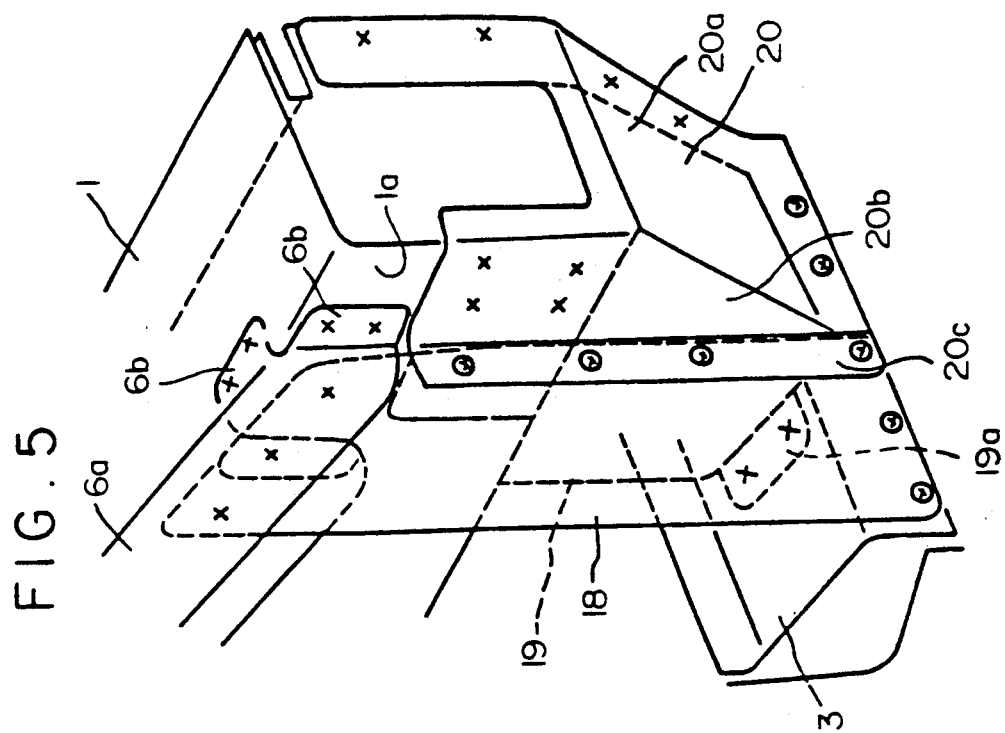
Figure 7:
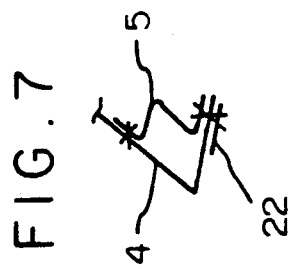
FIGS. 6, 7 and 8 are illustrations showing cross-sections of the essential part of FIG. 4 along lines A—A, B—B and C—C, respectively.
Figure 6:
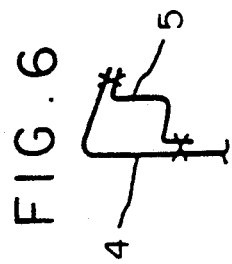
Figure 8:
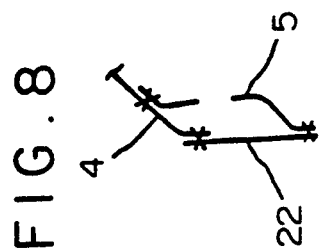

Referring to FIGS. 4, 5 and 6 showing part of the front body structure surrounding a head lamp installed therein, the upper shroud beam 6, made of a generally U-shaped channel member, is shaped so as to have an end portion 6a which is curved downward at each end. The curved end portion 6a is formed with flanges 6b through which the upper shroud beam 6 is secured, e.g., by welds, to inner surfaces of the front side frames 1. Between the upper shroud beam 6 and the cross beam 3, there is disposed, as a structural reinforcement, a first side panel 18, welded at its upper and lower ends to front surfaces of the upper shroud beam 6 and the cross beam 3.

A front cover plate 19 is welded to a lower portion of the inside surface of the front side frame 1 and to an upper surface of the cross beam 3 at its lower end 19a. A side cover plate 21, extending in the lengthwise direction along the front side frame 1, is welded, or otherwise secured, to the front side frame 1 so as to cover an opening of the front side frame, thereby forming a closed cross-section in the front side frame. The side cover plate 21 is formed, at its front end, with a plate extension extending downward. Each end of the cross beam 3 is welded, or otherwise secured, to the plate extension of the side cover plate 21.

The front body structure is reinforced by means of a gusset 20 at both sides. The gusset 20 comprises a front panel section 20a, bent at an angle, a side panel section 20b, and a flange section 20c bent at a right angle. These sections are formed integrally with each other. The gusset 20 is connected to the front side frame 1 by having an upper portion of the side panel section 20b welded, or otherwise secured, to the inside surface la of the front side frame 1 and to the first side panel 18, with the flange 20c riveted, or otherwise secured, to a marginal portion of the first side panel 18. A lower end portion of the bent front panel section 20a of the gusset 20 is riveted, or otherwise secured, to a front surface of the cross beam 3.

Front portions of the wheel apron 4 and the apron reinforcement 5 are, respectively, bent downward in the lengthwise direction, and further, laterally inward, so as to form an approximately L-shaped front end portion. An inner end of the L-shaped front end portion extends to an outer side surface of the front side frame 1 at a position opposite to the shroud upper 6 with respect to the front side frame 1. The L-shaped front end portion is secured, at its front end, to a second side panel 22, which is also approximately L-shaped. This second side panel 22 is secured at its one end to an outer side flange 1b of the front side frame 1.

As is apparent from the foregoing description, each of the front side frames 1, extending in the lengthwise direction of the car body, is secured, at both of its sides, to the upper shroud beam 6 and the second side panel 22, integrally united with the wheel apron 4, so as to form a space for a head lamp without providing an upper beam, which is necessary in the conventionally constructed front body portion.

Figure 9:
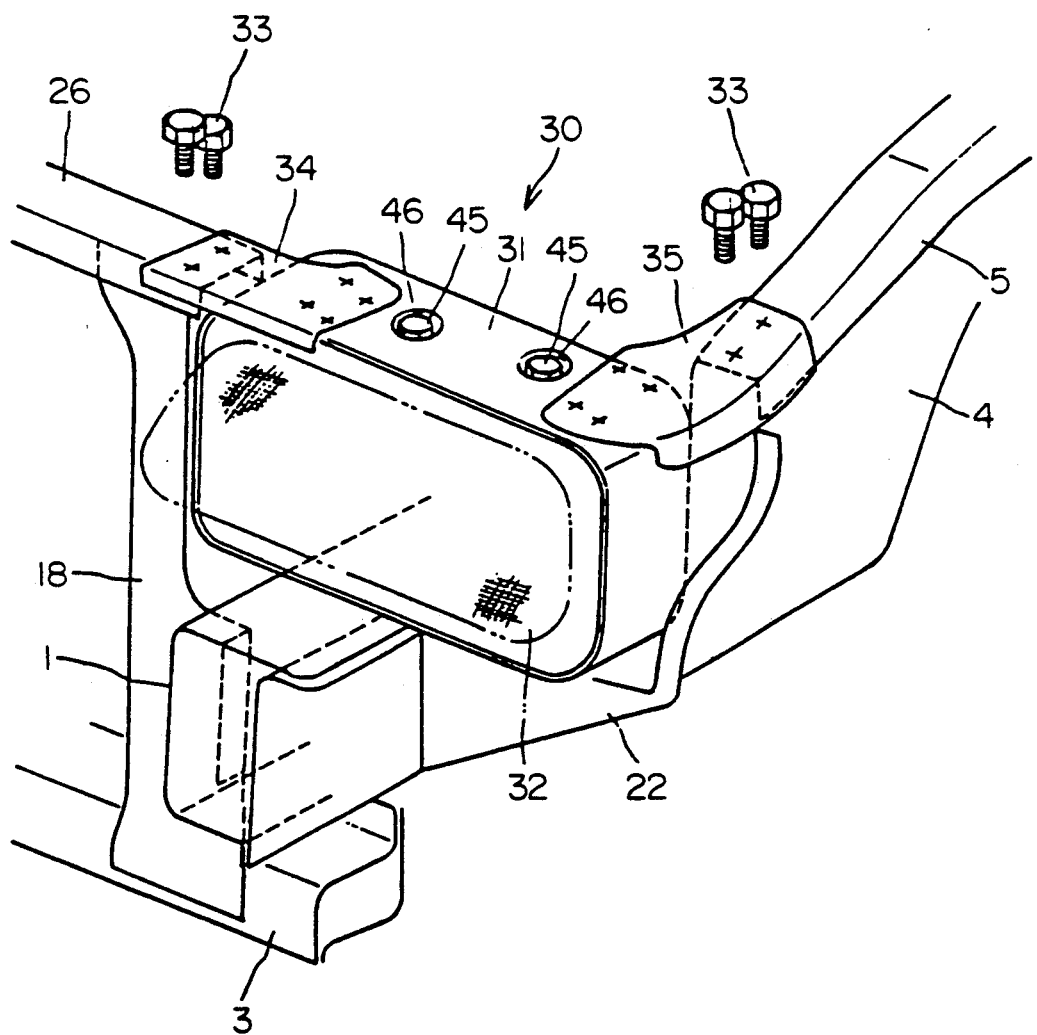
FIG. 9 is a schematic perspective view showing a front body structure of the car body in accordance with another preferred embodiment of the present invention.
Figure 10:
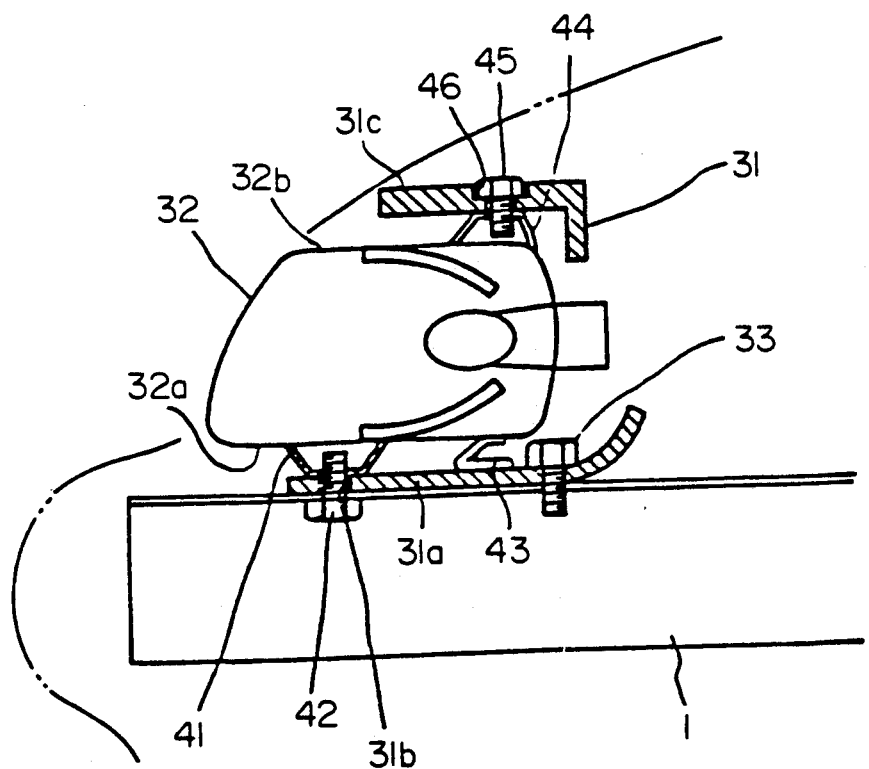
FIG. 10 is a cross-sectional view of FIG. 9.

Referring to FIGS. 9 and 10, part of a front body of a car body surrounding a head lamp installed therein in accordance with another preferred embodiment of the present invention is shown, comprising basically the same structure as the front body of the previous embodiment, excepting the connection of an upper shroud beam and a front side frame which will be described.

An upper shroud beam 26 is welded, or otherwise secured, at its end to an upper end of a first side panel 18. The panel 18 has a lower end portion which is rigidly secured to both a front side frame 1 and a cross beam 3.

As in the previous embodiment, front portions of the wheel apron 4 and the apron reinforcement 5 are, respectively, bent downward in the lengthwise direction and, further, laterally inward, so as to form an approximately L-shaped front end portion. An inner end of the L-shaped front end portion extends to an outer side surface of the front side frame 1 at a position opposite to the upper shroud beam 26 with respect to the front side frame 1. A second side panel 22, which is approximately L-shaped, is rigidly secured to a front end of the L-shaped front end portion of the wheel apron 4 and the apron reinforcement 5 and to the front side frame 1. Thus, the front side frame 1, front wheel apron 5 and upper shroud beam 26 together form a space 30 for a head lamp in the front body structure.

A generally parallelpiped shaped lamp housing 31, having a head lamp 32 therein, is placed in the space 30 and rigidly fastened by bolts 3 onto the front frame 1 at several points. The lamp housing 31 is further welded, or otherwise secured, at opposite upper end portions to the upper shroud beam 26 and the apron reinforcement 5 through gussets 34 and 35, respectively. In this manner, the shroud beam 26 and the wheel apron 4 are rigidly secured to the front side frame 1 by the aid of the lamp housing 31.

The head lamp 32 is supported in the lamp housing 31 by a beam aiming mechanism for adjusting the axis of beam of the head lamp 32. The beam aiming mechanism includes a bottom supporting bracket 41 and a pair of bottom urging spring members 43. The bottom supporting bracket 41 is rigidly secured to the bottom wall 32a of the head lamp 32 near a center of the bottom wall 32a and is secured to a bolt 42 which loosely passes through a bore 31b formed in a bottom wall 31a of the lamp housing 31 near front center edge of the bottom wall 31a. The bottom urging spring members 43 are rigidly secured to the bottom wall 31a of the lamp housing 31, at opposite sides with respect to the bottom support bracket 41, so as to urge a rear end portion of the bottom wall 32a of the head lamp 32 in a counterclockwise direction, as viewed in FIG. 10.

The beam aiming mechanism further includes a pair of adjusting brackets 44 in contact with opposite sides of at least a rear end portion of a top wall 32b of the head lamp 32. Each adjusting bracket 44 is formed with threads engageable with an adjusting screw 45. The lamp housing 31 is formed with bores 46 in an upper wall 31c at positions corresponding to the adjusting brackets 44 so as to hold the adjusting screws 45, respectively, for rotation. The adjusting screws 45, rotatably held by the upper wall 31c of the lamp housing 31, engage with the threads formed in the adjusting brackets 44. Screws 45, when turned, force the head lamp 32 to turn about the supporting bracket 41, against or with the force applied by the bottom urging spring members 43. Turning the adjusting screws 44 causes a motion of the head lamp 32 to suitably aim the axis of beam of the head lamp 32 in any desired direction.

Because the lamp housing 31 is rigidly secured to the front side frame 1 and interconnects the upper shroud beam 6 and the wheel apron 4 through the gussets 23, 24, respectively, to form a space for the head lamp in the front body, the front body has sufficient structural rigidity without the provision of an upper beam, which was necessary in the conventionally constructed front body.

Accordingly, in either embodiment, the front body of the car body can be designed to include any element such as a bonnet 15, which has a side line 15a lower than that of a conventional car body to provide a low bonnet front body. The car body can also be designed to have a length, overhanging between a center of the front wheel 16 and the bumper 17, which is shorter than that of a conventional car body to provide a short nose front body. Furthermore, because the front side frame is supported by the upper shroud beam 6 and the front wheel apron 4, the front side frame is subjected to less vibration.

It may be advantageous to provide the front body panel structure with a panel between the upper surface of the upper shroud beam and the wheel apron in order to provide an increase in rigidity. It is also possible to connect the head lamp to the upper shroud beam and the wheel apron through gussets, and to support the head lamp by brackets secured to the side panels on opposite sides of the front frame.

It is to be understood that although the invention has been described in detail with respect to preferred embodiments thereof, various other embodiments and variants are possible which fall within the scope and spirit of the invention, and such other embodiments and variants are intended to be covered by the following claims.

What is claimed is:

1. A front body structure of a vehicle, having a pair of front side frames separately located in a transverse direction of the vehicle and extending in a lengthwise direction, from front to back, of the vehicle, an opening being formed between the pair of front side frames for a radiator grill, said front body structure comprising:
   a front wheel apron rigidly attached to one side of each of said front side frames; and
   an upper shroud beam extending in the transverse direction for defining an upper end of said opening, said upper shroud beam being directly attached to another side of each of said front side frames so as to form a space for a head lamp between said upper shroud beam and each said front wheel apron.

2. A front body structure of a vehicle, having a pair of front side frames separately located in a transverse direction of the vehicle and extending in a lengthwise direction, from front to back, of the vehicle, an opening being formed between the pair of front side frames for a radiator grill, and a head lamp, said front body structure comprising:
   A front wheel apron connected to one side of each of said front side frames; and
   an upper shroud beam extending in the transverse direction for defining an upper end of said opening and having an end spaced apart from said front wheel apron;
   At least one connecting member rigidly secured between said upper shroud beam end and said wheel apron so as to form a mounting for said head lamp between said upper shroud beam and each said front wheel apron.

3. A front body structure as defined in claim 2, wherein said connecting member comprises a housing secured to one of said front side frame for receiving therein said head lamp.

* * * * *